US006848391B1

(12) United States Patent
Allen

(10) Patent No.: US 6,848,391 B1
(45) Date of Patent: Feb. 1, 2005

(54) SYSTEM FOR COATING PARTICULATE WITH A FLUID

(76) Inventor: James M. Allen, 623 Pier 2, Lincoln, NE (US) 68528

( * ) Notice: Subject to any disclaimer, the term of this patent is extended or adjusted under 35 U.S.C. 154(b) by 70 days.

(21) Appl. No.: 10/602,207

(22) Filed: Jun. 24, 2003

(51) Int. Cl.[7] .............................. B05C 5/00; A23G 3/26

(52) U.S. Cl. .......................................... 118/19; 118/300

(58) Field of Search ................................. 118/300, 303, 118/19, 29, 20, 313; 366/137.1, 138, 141, 144, 136

(56) References Cited

U.S. PATENT DOCUMENTS

| | | | | |
|---|---|---|---|---|
| 4,323,313 A | * | 4/1982 | Oberg et al. | 366/142 |
| 4,617,872 A | * | 10/1986 | Melliger | 118/19 |
| 4,930,900 A | | 6/1990 | Mitchell et al. | 366/168 |
| 5,388,761 A | * | 2/1995 | Langeman | 239/1 |
| 5,399,186 A | * | 3/1995 | Derrah et al. | 71/64.02 |
| 5,645,217 A | | 7/1997 | Warren | 239/75 |
| 5,843,621 A | * | 12/1998 | Schafer | 430/273.1 |
| 2003/0051523 A1 | | 3/2003 | Tabel | 71/64.02 |

FOREIGN PATENT DOCUMENTS

| | | | |
|---|---|---|---|
| GB | 2165469 | * | 4/1986 |

* cited by examiner

*Primary Examiner*—Richard Crispino
*Assistant Examiner*—Yewebdar Tadesse
(74) *Attorney, Agent, or Firm*—Thomte, Mazour & Niebergall; Shane M. Niebergall

(57) ABSTRACT

A system for coating particulate material with temperature-sensitive materials is provided with heated containers, each having a continuous loop of supply and return lines. Each continuous loop is coupled with a spray manifold that is positioned closely adjacent a mixing vessel. The temperature-sensitive fluid is pumped through the continuous loops to maintain the desired temperature when the fluid is not being applied to the particulate material within the vessel. The separate loops prevent undesired cross-contamination. A simple scale assembly is used for metering out the fluid.

27 Claims, 2 Drawing Sheets

SYSTEM FOR COATING PARTICULATE WITH A FLUID

BACKGROUND OF THE INVENTION

The present invention relates to systems for coating particulate matter and more specifically to systems for coating particulate matter with one or more temperature-sensitive materials.

DESCRIPTION OF THE PRIOR ART

Several different industries require the coating or impregnation of particulate material with one or more types of fluid materials. In agriculture, for example, it is often desirable to impregnate bulk dry fertilizer with one or more various liquid compositions, such as a herbicide. Oftentimes in these instances, the dry particulate can be held within a large mixing container, and the fluid can be applied to the particulate matter while the container mixes the particulate matter. However, this can be somewhat difficult when the impregnating fluid is solid at room temperature. In such instances, the container holding the impregnating material must be heated before the material is applied to the particulate matter. For small operations, this may not pose much of a challenge when a single batch is mixed for a single use. Typically, however, it may be desirable to impregnate large quantities of particulate material in a short amount of time. Moreover, it may be desirable to impregnate the dry particulate material with more than one liquid. In these instances, a large impregnation facility is typically required. However, such systems are often highly complex, which increases the cost to assemble, operate, and maintain the systems.

Large impregnation facilities have typically employed a large mixing vessel, a plurality of heated containers of impregnation material, and a complex array of actively heated lines to deliver the impregnation material to the mixing vessel. The heated lines are typically necessary because the impregnation material begins to cool as soon as it leaves the heated container. Accordingly, when the mixing and impregnating operation is stopped, the user is left with a substantial length of line between the mixing vessel and the heated container that is filled with rapidly cooling impregnation material. If the user waits too long before resuming the mixing and impregnating process with another batch of material, the impregnating material will cool to the ambient temperature and solidify within the lines. Frequently, users will employ heated valves and nozzles to prevent the necessity of tearing apart the system to clean intricate moving parts that have simply held the impregnating material too long. Accordingly, as heated lines, valves, and nozzles are included within systems, they become more complex and costly to operate.

In operations that use one impregnating fluid within one batch, contamination is rarely a problem. Once the dry particulate material is impregnated with the first liquid impregnating material, the operator can simply connect the next container of impregnating material and proceed with the impregnating process. However, where the user completes an impregnation operation and then must mix and impregnate a different dry particulate material with a different impregnating fluid, cross-contamination may become a serious concern. Accordingly, any non-heated lines, valves, and nozzles must be disassembled and cleaned prior to commencing the new operation. This only serves to waste the user's valuable time and resources. However, it is oftentimes more efficient to go through the elaborate cleaning process between operations than it would be to assemble two completely separate mixing and impregnating stations.

Accordingly, what is needed is an impregnating system that is capable of repeatedly, impregnating dry particulate with temperature-sensitive impregnating materials that is also simple in construction, operation and maintenance.

SUMMARY OF THE INVENTION

The system for coating particulate matter with temperature-sensitive materials of the present invention is provided with one or more containers that hold different impregnating materials. When a particular impregnating material is solid at room temperature, a heat-generating assembly will be coupled with the containers to liquefy the impregnating material. A supply line extends from each container to a spray manifold that is coupled to a large mixing vessel. A return line is provided for each container and couples the spray manifold and supply line to the container in order to create a continuous loop through which the impregnating material can travel. Such a continuous loop is provided for each separate container of impregnating material, and particularly where different impregnating materials are used and cross-contamination is a concern.

Pumps are placed in communication with each separate continuous loop to deliver the impregnating material through each continuous loop. Accordingly, where a temperature-sensitive impregnating material is used, it leaves its container within a specified temperature range, travels out toward the mixing vessel, returns via the return line and is redeposited within the heated container before the impregnating material has a chance to cool and solidify within the lines. Valves positioned adjacent the manifold allow the user to selectively apply one or more impregnating fluids to the dry particulate within the mixing vessel. In this manner, the impregnating fluid never hardens within the lines, and the separate continuous loops provide for a lack of cross-contamination.

A scale is disposed beneath each of the heated containers, and a reading is taken prior to commencing any impregnating operation. Accordingly, as the user begins a new operation, the scale is simply read until a sufficient amount of the impregnating material has left the container, resulting in a lighter reading on the scale.

Where long distances between the heated containers and the mixing vessel need to be traveled, insulated supply and/or return lines can be used. However, the system lends itself to ease of use without the necessity of heated lines, valves or nozzles and other complex or expensive equipment.

Accordingly, a principal object of the present invention is to provide a system for coating particulate matter with one or more temperature-sensitive materials.

A further object of the present invention is to provide a system for coating particulate matter with a plurality of different materials without cross-contamination.

Still another object of the present invention is to provide a system for coating particulate matter with temperature-sensitive materials without the necessity of heated lines, valves, and/or nozzles.

Yet another object of the present invention is to provide a system for coating particulate matter with a fluid that incorporates a simple and inexpensive metering system.

Still another object of the present invention is to provide a system for coating particulate matter with temperature-sensitive materials that is simple in assembly and use.

Yet another object of the present invention is to provide a system for coating particulate matter with temperature-sensitive materials that is inexpensive to assemble, use and maintain.

These and other objects will be apparent to those skilled in the art.

DESCRIPTION OF THE PREFERRED EMBODIMENT

Figure 1:
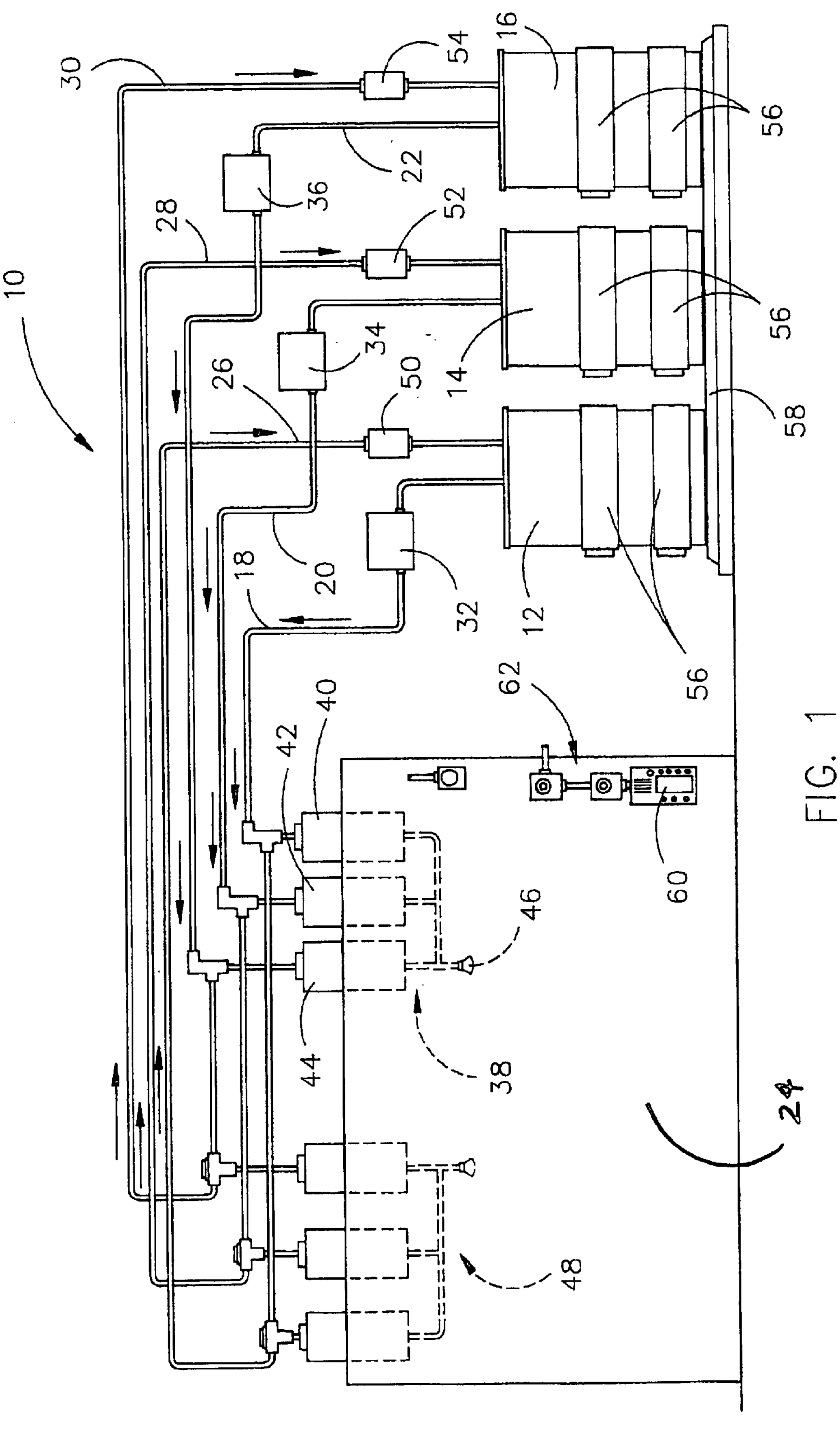
FIG. 1 is a schematic of one possible embodiment of the system of the present invention.
Figure 2:
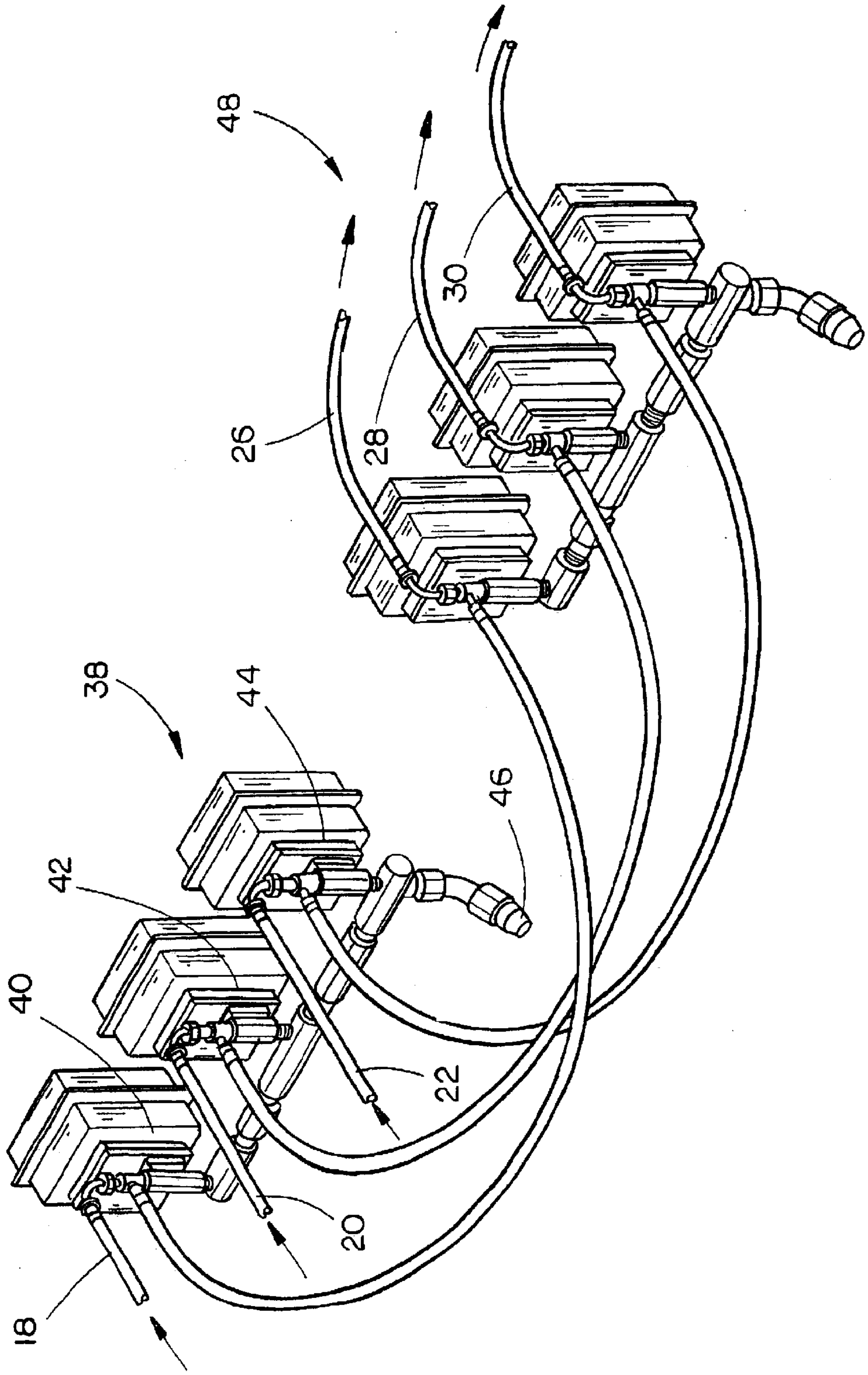
FIG. 2 is a perspective view of an embodiment of the output nozzle manifold of the present invention.

The particulate coating/impregnating system 10 of the present invention is generally depicted in FIG. 1 in one preferred embodiment. Although the system 10 will generally be described as it could be used in the agricultural field for impregnating dry particulate fertilizer with temperature-sensitive materials, such as many known herbicides, it is contemplated that the system 10 could be used in nearly any industry for nearly any type of coating and/or impregnating operation. For example, it is contemplated that the system 10 could be used for the coating of small rock particulate with a tar-based material. Accordingly, the particular uses and configurations set forth herein are intended for the ease of description only and should not be considered to be limiting in any manner.

The system 10 will typically be provided with one or more containers to hold the impregnating material. In FIG. 1, the embodiment depicted is shown with a first container 12, a second container 14, and a third container 16. Separate supply lines are disposed within each container. As depicted, supply lines 18, 20 and 22 are disposed within and extend outwardly from containers 12, 14 and 16, respectively. The supply lines travel outwardly to the mixing vessel 24, which may be positioned adjacent to or remotely from the containers. Return lines 26, 28 and 30 are run from the vessel 24 to containers 12, 14 and 16, respectively, in order to form continuous loops associated with each container. Pumps 32, 34 and 36 are each coupled to a separate continuous loop to deliver the impregnating material therethrough.

At least one spray manifold 38 joins the supply lines 18, 20 and 22 with the return lines 26, 28 and 30 at the mixing vessel 24. Specifically, a valve, such as valves 40, 42 and 44 depicted in FIG. 1, join their respective supply and return lines with the manifold 38. A spray nozzle 46 is coupled to the terminating end of the manifold 38 and is positioned to spray into the vessel 34 and onto the mixing dry particulate therein. It is contemplated that one of several known mixing assemblies could be used within the vessel 24 to continuously mix the dry particulate as the impregnating fluid is applied. For large operations, it is contemplated that a plurality of manifolds could be used and spaced apart from one another to provide an even application. FIG. 1 depicts the use of a second manifold 48, which is assembled and operated in much the same manner as manifold 38.

Valves 50, 52 and 54 are mated with the return lines 26, 28 and 30, respectively. In operation, valves 50, 52 and 54 would typically remain open while the valves associated with manifolds 38 and 48 would be closed. In this configuration, the pumps 32, 34 and 36 circulate the impregnating fluids from containers 12, 14 and 16 throughout their respective continuous loops. Accordingly, the impregnating material is continuously recycled through the containers and their supply lines. This will be particularly relevant where temperature-sensitive impregnating materials are used. For example, many contemporary liquid herbicides are provided in 55-gallon drums and are the consistency of peanut butter at room temperature. Accordingly, in order to liquefy the herbicide, it is necessary to heat the containers to approximately 150°. However, it is contemplated that different coating/impregnating materials will require different temperatures to maintain their liquid state. Accordingly, it is preferred that each separate container be provided with a separate means for heating the same. Once such means, depicted in FIG. 1, incorporates the use of heating belts 56 around the perimeter of each of the containers. Each pair of heating belts 56 can be set to warm its associated container to the appropriate temperature range. It is contemplated, however, that other heating means, including warming blankets, warming coils disposed within the impregnating material, and even warming baths (in which the individual containers could be disposed) could be used. For example, as the impregnating material leaves container 12 through supply line 18, it is at or above the temperature needed to keep the material in a fluid state. The impregnating material travels through manifolds 38 and 48, returning through the return line 26 and re-entering the container 12. In this arrangement, the impregnating material continuously recycles to remain within the appropriate temperature range. Where longer runs of supply lines and return lines must be used, it is contemplated that insulated lines could be incorporated within the system. However, a layer of insulation could be applied to any line deemed necessary after assembly of the system.

When it is desired to apply the impregnating material to the dry particulate within the vessel 24, valves 50, 52 and/or 54 are closed; and the valves 40, 42 and 44 (and the associated valves in other system manifolds, such as manifold 48) are opened. The pressure generated by pumps 32, 34 and/or 36 generate sufficient pressure within their associated loops to dispense the impregnating material into the manifolds, through the nozzles, and into the mixing vessel 24. To more accurately regulate the amount of impregnating material being applied, a scale 58 could be positioned to support each of the containers 12, 14 and 16. The scale display 60 would be "zeroed" prior to commencing the application of the impregnating material. Then, after the repositioning of the proper valves, the scale could be read until a sufficient volume of impregnating material had left the system and thus lowered the reading from the scale to a desired level. At that point, the valves are reversed, using a simple manual valve actuation system 62 or other known automated means. The valves 40, 42 and 44 in the manifold 38 are shut (and those associated with any other manifold in the system), and the relevant valves 50, 52 and/or 54 are opened. In this position, the impregnating material resumes its recirculation in order to maintain its liquid temperature.

Preferably, the system 10 will be provided with a container filled with an appropriate cleaning agent for the removal of unwanted impregnating material from the manifolds 38 and 48 and the mixing vessel 24. For example, container 12 could be provided with the cleaning agent, which would be pumped through supply line 18 by the pump 32 into the manifold 38. With the associated valve 40 open, the cleaning agent travels through the manifold, past valves 42 and 44, and through the nozzle 46 into the mixing vessel 24. In this manner, each path taken by impregnating materials traveling from containers 14 or 16 is cleaned. With the manifolds and mixing vessel clean, the valves 50 and 40 would be reversed, and a new operation could be commenced with a different impregnating material without fear of cross-contamination from previously used impregnating materials.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A system for coating particulate with at least one fluid, comprising:

at least one container adapted to hold the at least one fluid;

a blender having an inner chamber adapted to selectively receive the particulate and the at least one fluid;

a supply line, adapted to carry the at least one fluid, having first and second end portions; said first end portion being operatively coupled with said at least one container;

a return line, adapted to carry the at least one fluid, having first and second end portions; said first end portion being operatively coupled with the second end portion of said supply line; said second end portion of said return line being operatively coupled with said at least one container; said supply line and said return line forming a continuous loop for the selective circulation of the fluid away from and back to said at least one container;

a pump for selectively forcing the fluid through said supply and return lines;

an output nozzle operatively coupled to the second end portion of said supply line and the first end portion of said return line; said output nozzle being positioned adjacent to and in selective fluid communication with said blender; and a valve operatively coupled to said return line to selectively restrict the flow of said at least one fluid through said return line for selective direction of said at least one fluid through said output nozzle.

2. The system of claim 1 further comprising means operatively coupled to said a container for heating said container and the fluid within said container to a desired temperature range.

3. The system of claim 2 wherein said supply line is insulated.

4. The system of claim 3 wherein said return line is insulated.

5. The system of claim 1 further comprising a scale for supporting said container and determining the weight of said container and the fluid within said container.

6. The system of claim 1 comprising a plurality of separate containers, each being adapted to hold the at least one fluid.

7. The system of claim 6 further comprising a plurality of separate supply lines and a plurality of separate supply lines and a plurality of separate return lines.

8. The system of claim 7 wherein each of said plurality of separate supply lines is operatively coupled with one of said plurality of separate return lines so that a plurality of separate continuous loops are formed.

9. The system of claim 8 further comprising a plurality of pumps; each of said plurality of pumps being operatively coupled with one of said plurality of separate continuous loops to circulate the at least one fluid through said plurality of separate continuous loops.

10. The system of claim 9 wherein each of said plurality of separate continuous loops is operatively coupled with one of said plurality of separate containers.

11. The system of claim 10 wherein said output nozzle is operatively coupled to each of said plurality of separate continuous loops.

12. The system of claim 11 further comprising a plurality of valves; each of said plurality of valves being operatively coupled to said output nozzle and at least one of said plurality of separate continuous loops so that one or more of said separate continuous loops can be selectively placed in open fluid communication with said output nozzle.

13. The system of claim 12 further comprising means for heating said plurality of separate containers and the fluid within said plurality of separate containers.

14. The system of claim 13 wherein said plurality of separate supply lines are insulated.

15. The system of claim 14 wherein said plurality of separate return lines are insulated.

16. The system of claim 15 further comprising means for supporting said plurality of separate containers and determining the weight of the fluid within said plurality of separate containers.

17. The system of claim 13 wherein one of said plurality of separate containers is filled with a cleaning fluid.

18. A system for coating particulate with at least one fluid, comprising:

a plurality of separate containers, each being adapted to hold the at least one fluid;

a blender having an inner chamber adapted to selectively receive the particulate and the at least one fluid;

a plurality of separate supply lines, adapted to carry the at least one fluid, each having first and second end portions; each of said first end portions of said plurality of supply lines being operatively coupled with at least one of said plurality of containers;

a plurality of separate return lines, adapted to carry the at least one fluid, having first and second end portions; each of said first end portions being operatively coupled with a second end portion of at least one of said plurality of supply lines; said second end portions of said plurality of return lines being operatively coupled with at least one of said at least one containers; said supply lines and said return lines forming a plurality of separate continuous loops for the selective circulation of the fluid away from and back to said plurality of containers;

a pump for selectively forcing the fluid through said supply and return lines; and an output nozzle operatively coupled to the second end portions of said supply lines and the first end portions of said return lines; said output nozzle being positioned adjacent to and in selective fluid communication with said blender.

19. The system of claim 18 further comprising a plurality of pumps; each of said plurality of pumps being operatively coupled with one of said plurality of separate continuous loops to circulate the at least one fluid through said plurality of separate continuous loops.

20. The system of claim 19 wherein each of said plurality of separate continuous loops is operatively coupled with one of said plurality of separate containers.

21. The system of claim 20 wherein said output nozzle is operatively coupled to each of said plurality of separate continuous loops.

22. The system of claim 21 further comprising a plurality of valves; each of said plurality of valves being operatively coupled to said output nozzle and at least one of said plurality of separate continuous loops so that one or more of said separate continuous loops can be selectively placed in open fluid communication with said output nozzle.

23. The system of claim 22 further comprising means for heating said plurality of separate containers and the fluid within said plurality of separate containers.

24. The system of claim 23 wherein said plurality of separate supply lines are insulated.

25. The system of claim 24 wherein said plurality of separate return lines are insulated.

26. The system of claim 25 further comprising means for supporting said plurality of separate containers and determining the weight of the fluid within said plurality of separate containers.

27. The system of claim 23 wherein one of said plurality of separate containers is filled with a cleaning fluid.

* * * * *